United States Patent
Dejaco et al.

(10) Patent No.: US 11,460,484 B2
(45) Date of Patent: Oct. 4, 2022

(54) METHOD AND DEVICE FOR DIAGNOSING AND MONITORING VEHICLE COMPONENTS

(71) Applicant: SIEMENS MOBILITY GmbH, Vienna (AT)

(72) Inventors: Daniela Dejaco, Graz (AT); Bernhard Lukas Girstmair, Graz (AT); Gerald Grabner, Graz (AT); Andreas Haigermoser, Oberhaag (AT); Johannes Simon, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 381 days.

(21) Appl. No.: 16/574,854

(22) Filed: Sep. 18, 2019

(65) Prior Publication Data

US 2020/0088760 A1    Mar. 19, 2020

(30) Foreign Application Priority Data

Sep. 19, 2018   (AT) .............................. A 50798/2018

(51) Int. Cl.
*G01P 21/00* (2006.01)
*G01M 17/10* (2006.01)

(52) U.S. Cl.
CPC ............. *G01P 21/00* (2013.01); *G01M 17/10* (2013.01)

(58) Field of Classification Search
None
See application file for complete search history.

(56) References Cited

U.S. PATENT DOCUMENTS

| | | | |
|---|---|---|---|
| 9,122,956 B1 * | 9/2015 | Fink | ..................... G06K 9/6298 |
| 2019/0049958 A1 * | 2/2019 | Liu | .......................... G01S 7/497 |

FOREIGN PATENT DOCUMENTS

| | | | | |
|---|---|---|---|---|
| CN | 102607867 | | 7/2012 | |
| CN | 102607867 A | * | 7/2012 | |
| DE | 19636443 | | 3/1998 | |
| DE | 19636443 A1 | * | 3/1998 | ............. B60T 8/172 |
| DE | 102007024065 | | 1/2009 | |
| DE | 102011106302 | | 9/2012 | |
| DE | 102015218941 | | 3/2017 | |
| DE | 102015218941 A1 | * | 3/2017 | ............. B61L 3/008 |
| EP | 0953889 | | 11/1999 | |
| EP | 0953889 A2 | * | 11/1999 | ............... G05B 9/02 |

(Continued)

*Primary Examiner* — Douglas X Rodriguez
*Assistant Examiner* — Carl F. R. Tchatchouang
(74) *Attorney, Agent, or Firm* — Cozen O'Connor

(57) ABSTRACT

A method and device for the diagnosing and monitoring vehicle components, wherein measurements with respect to a first measuring point, a second measuring point, a third measuring point and a fourth measuring point are performed and a first measured value set, a second measured value set, a third measured value set and a fourth measured value set are formed, where a reference value set is determined with respect to a reference point via the first measured value set, the second measured value set and the third measured value set, where a test value set is formed with respect to the fourth measuring point via the reference value set, and where a fault in or damage to the fourth sensor is detected by comparing the test value set with the fourth measured value set such that a high level of availability when used by a vehicle is achieved.

15 Claims, 3 Drawing Sheets

(56) References Cited

FOREIGN PATENT DOCUMENTS

| WO | WO 02/22424 | 3/2002 | |
| WO | WO-0222424 A1 * | 3/2002 | ............... B61K 9/00 |
| WO | WO 2014/048737 | 4/2014 | |
| WO | WO2014/048768 | 4/2014 | |
| WO | WO-2014048737 A1 * | 4/2014 | ............... B61K 9/04 |

* cited by examiner

METHOD AND DEVICE FOR DIAGNOSING AND MONITORING VEHICLE COMPONENTS

BACKGROUND OF THE INVENTION

1. Field of the Invention

The invention relates to a method and to a device for the diagnosis and monitoring of vehicle components, in particular for rail vehicles, where measurements with respect to at least one first measuring point, one second measuring point, one third measuring point and one fourth measuring point of a vehicle are performed via at least one first sensor, one second sensor, one third sensor and one fourth sensor, where signal processing and a signal evaluation occurs in at least one arithmetic unit with correspondingly transmitted measuring signals and thereby at least one first measured value set, one second measured value set, one third measured value set and one fourth measured value set are formed.

2. Description of the Related Art

Vehicles, in particular rail vehicles, must exhibit a high level of driving safety. An accurate assessment and prediction of technical conditions of vehicles, chassis and other vehicle components is therefore important.

WO 2014/048768 A1 discloses a diagnostic device for a rail vehicle, where acceleration sensors and an electronic diagnostic device arranged on a chassis are provided. Appropriate diagnostics of the chassis are made based on acceleration measurements, which are evaluated in the diagnostic device.

High quality and a low error rate of measurements are important for vehicle diagnostics. In particular, it is necessary that measurement errors due to faults, or damage to sensors, can be detected and, accordingly, incorrect measurement values from diagnostic processes (for example, an evaluation and interpretation of measured values and a generation of warning events) can be ruled out or at least identified.

DE 10 2011 106 302 B3, for example, which is known in this regard, describes a method for detecting measurement errors of sensors. Sensor values are first determined via a calibration method, forces and/or moments determined via inversion of a measuring matrix and then pseudo sensor values are calculated via a back transformation of the forces and/or moments. The sensor values are compared with the pseudo sensor values to detect a possible measurement error therefrom. This approach, in its conventional form, has the disadvantage that no method for accurately assigning a measurement error to a particular sensor is shown.

SUMMARY OF THE INVENTION

In view of the foregoing, it is therefore an object of invention to provide a method that allows a particularly precise identification of faulty sensors.

This and other objects and advantages are achieved in accordance with the invention by a method, wherein via at least first measured value set, a second measured value set and a third measured value set, a reference value set is determined with respect to a reference point of the vehicle and via the reference value set, a test value set is formed with respect to the fourth measuring point, where the determination of the reference value set and the test value set occurs via formation of kinematic relationships between the at least one first measuring point, the second measuring point, the third measuring point and the fourth measuring point, on the one hand, and the reference point on the other hand, and where by comparing the test value set with the fourth measured value set, a fault in or damage to the fourth sensor is detected. This results in a diagnosis and/or monitoring of the fourth sensor, in other words a vehicle component, and therefore a high level of safety and high availability in a vehicle operation.

It is also conceivable to monitor the first sensor, the second sensor or the third sensor. For example, for monitoring the first sensor, the reference value set and the test value set are formed based on the second measured value set originating from the second sensor, the third measured value set originating from the third sensor and the fourth measured value set originating from the fourth sensor. A detection of faults of the first sensor is performed by comparing the test value set with the first measured value set originating from the first sensor. This results in a mutual check or monitoring of the first sensor, the second sensor, the third sensor and the fourth sensor. As a result, no separate test devices for the first sensor, second sensor, third sensor, and fourth sensor are required, resulting in both design and functional simplification.

The diagnostics and/or monitoring of the sensors have a high level of safety and a low error rate because the reference value set and the test value set are formed based on three sensors or three sets of measurements. If the reference value set and the test value set are formed, for example, based on the first sensor or the first measured value set, then the second sensor or the second measured value set and the third sensor or the third measured value set, the fourth sensor is monitored. Moreover, if, for example, the first measured value set has an error, then this error is partially compensated by the second measured value set and the third measured value set when the reference value set and the test value set are formed.

The error in the first measured value set does not have an effect in the comparison of the test value set with the fourth measured value set for the detection of a fault in the fourth sensor in so far as an existing fault in the fourth sensor is not detected or that a non-existent fault in the fourth sensor is displayed.

The first sensor, the second sensor, the third sensor and the fourth sensor may, for example, be formed as a three-axis acceleration sensor, which can be arranged on a vehicle or a vehicle component (for example, on a chassis, a chassis frame or on wheelset bearing housings) and measure accelerations in three spatial directions.

It is expedient if the reference value set and the test value set are formed from angular position difference values between a reference coordinate system in the reference point, on the one hand, and a first coordinate system in the at least first measuring point, a second coordinate system in the second measuring point, a third coordinate system in the third measuring point and a fourth coordinate system in the fourth measuring point on the other hand. This measure can also take into account installation positions of the first sensor, the second sensor, the third sensor and the fourth sensor that are rotated with respect to the reference coordinate system.

In an advantageous embodiment, the reference value set is formed by ignoring square angular velocity terms. This measure simplifies the inventive method and reduces a required computing power for monitoring the first sensor, the second sensor, the third sensor and/or the fourth sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail below with reference to exemplary embodiments, in which.

DETAILED DESCRIPTION OF THE EXEMPLARY EMBODIMENTS

Figure 1:
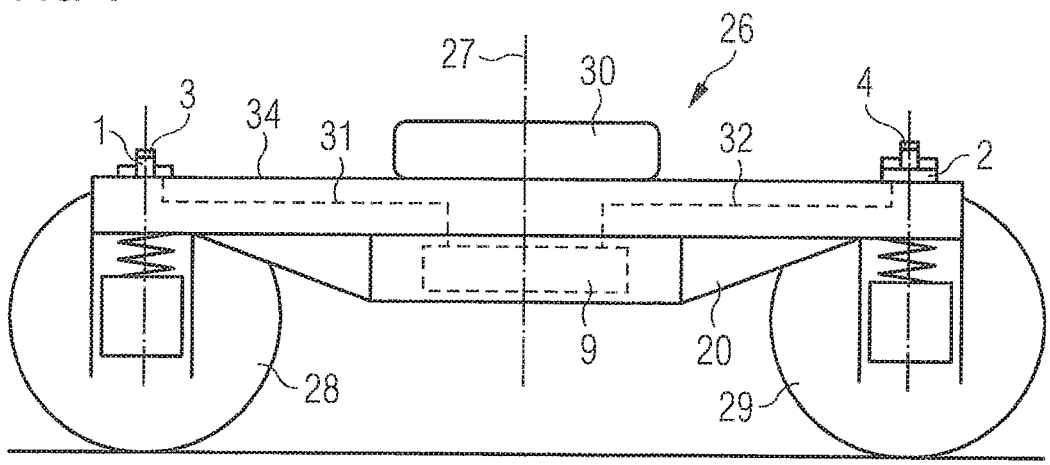
FIG. 1 shows a chassis of a rail vehicle with a first sensor, a second sensor, a third sensor and a fourth sensor, as well as an arithmetic unit in accordance with the invention.

FIG. 1 shows a chassis 26 of a vehicle designed as a rail vehicle. The chassis 26 comprises a primary-sprung chassis frame 20 with a cover surface 34, which is connected to a first wheel set 28 and a second wheel set 29 and upon which a secondary spring mechanism 30 is arranged. The chassis 26 is connected to a railcar body (not shown). On the chassis frame 20 in regions above the first wheel set 28 and the second wheel set 29, a first sensor 1, a second sensor 2, a third sensor 3 and a fourth sensor 4 are provided which, with respect to a vertical axis 27 of the chassis frame 20, are arranged mutually offset. This results in a high computational stability when performing an inventive method. Furthermore, an arithmetic unit 9 is provided on the chassis frame 20, which is connected via a first data line 31 to the first sensor 1 as well as via a second data line 32 to the second sensor 2 and via further, invisible data lines to the third sensor 3 as well as to the fourth sensor 4. Inventively it is also conceivable, in order to ensure redundancy, to connect more than one arithmetic unit 9 to the first sensor 1, the second sensor 2, the third sensor 3 and the fourth sensor 4. Furthermore, it is conceivable that the arithmetic unit 9 is provided, for example, in the railcar body of the vehicle, and the first sensor 1, the second sensor 2, the third sensor 3 and the fourth sensor 4 are connected via corresponding lines between the chassis 26 and the railcar body to the arithmetic unit 9.

The first sensor 1, the second sensor 2, the third sensor 3 and the fourth sensor 4, as well as the arithmetic unit 9, are connected via an on-board power supply of the vehicle and an on-board data bus of the vehicle, which are not shown.

An exemplary embodiment, described in connection with FIG. 3, of an inventive method is performed via the first sensor 1, the second sensor 2, the third sensor 3 and the fourth sensor 4 and the arithmetic unit 9.

Figure 2:
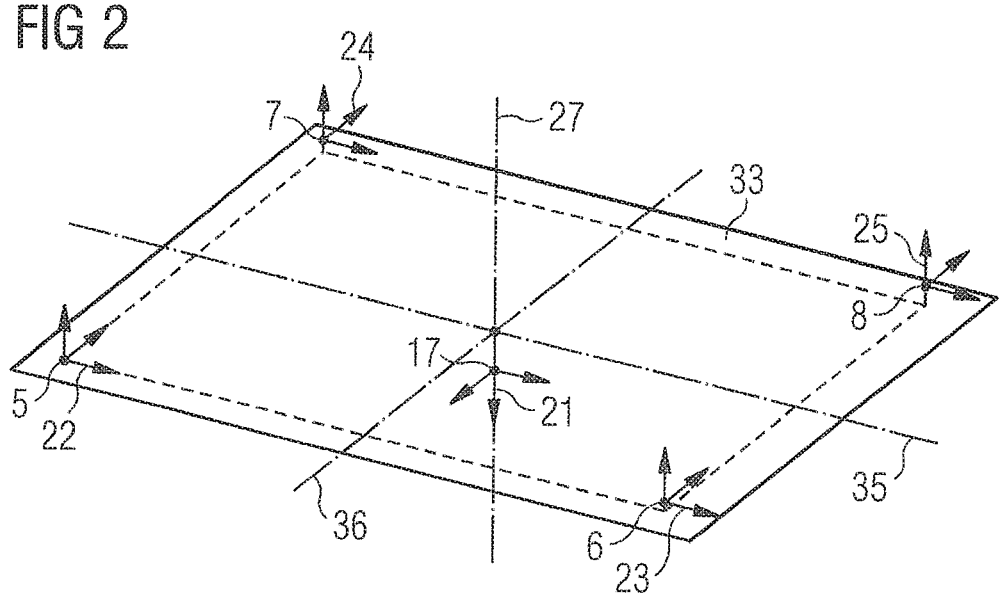
FIG. 2 shows a schematic representation illustrating a first measuring point, a second measuring point, a third measuring point and a fourth measuring point as well as a reference point in accordance with the invention.

FIG. 2 shows a schematic representation with a first measuring point 5, a second measuring point 6, a third measuring point 7 and a fourth measuring point 8. The first measuring point 5, the second measuring point 6, the third measuring point 7 and the fourth measuring point 8 correlate with installation positions of a first sensor 1, a second sensor 2, a third sensor 3 and a fourth sensor 4 shown in FIG. 1 on a chassis frame 20 also shown in FIG. 1.

A base measuring plane 33 is formed from a cover surface 34 of the chassis frame 20 visible in FIG. 1. The first measuring point 5 is provided on the base measuring plane 33. The second measuring point 6, the third measuring point 7 and the fourth measuring point 8 are offset relative to this base measuring plane 33 and relative to each other with respect to a vertical axis 27 of the chassis frame 20 also shown in FIG. 1. A reference point 17, which lies in the center of gravity of the chassis frame 20, is offset downwards relative to this base measuring plane 33 with respect to this vertical axis 27. Inventively it is also conceivable that the first measuring point 5 and the first sensor 1, the second measuring point 6 and the second sensor 2, the third measuring point 7 and the third sensor 3 and the fourth measuring point 8 and the fourth sensor 4 are arranged offset relative to another plane, for example, to a longitudinal plane of the chassis frame 20 or a transverse plane of the chassis frame 20, and each have different positions with respect to this plane, in other words are not provided in one plane, but have identical height positions with respect to the vertical axis 27.

A first coordinate system 22 is provided in the first measuring point 5, a second coordinate system 23 is provided in the second measuring point 6, a third coordinate system 24 is provided in the third measuring point 7 and a fourth coordinate system 25 is provided in the fourth measuring point 8 and a reference coordinate system 21 is provided in the reference point 17. Reference accelerations of the reference point 17 in coordinate directions of the reference coordinate system 21 are determined from accelerations of the first measuring point 5 in coordinate directions of the first coordinate system 22, of the second measuring point 6 in coordinate directions of the second coordinate system 23 and of the third measuring point 7 in coordinate directions of the third coordinate system 24 via an embodiment of an inventive method described in connection with FIG. 3 via a first kinematic correlation. Accelerations of the fourth measuring point 8 in coordinate directions of the fourth coordinate system 25 are determined from the accelerations of the reference point 17, as described in connection with FIG. 3, via a second kinematic correlation. The accelerations determined for the fourth measuring point 8 as described above, as also disclosed in connection with FIG. 3, are compared with accelerations measured by the fourth sensor 4 at the fourth measuring point 8.

The first coordinate system 22, the second coordinate system 23, the third coordinate system 24 and the fourth coordinate system 25 are rotated relative to the reference coordinate system 21 in addition to being offset. Consequently, a coordinate transformation must be performed via rotary matrices R known from the prior art.

Figure 3:
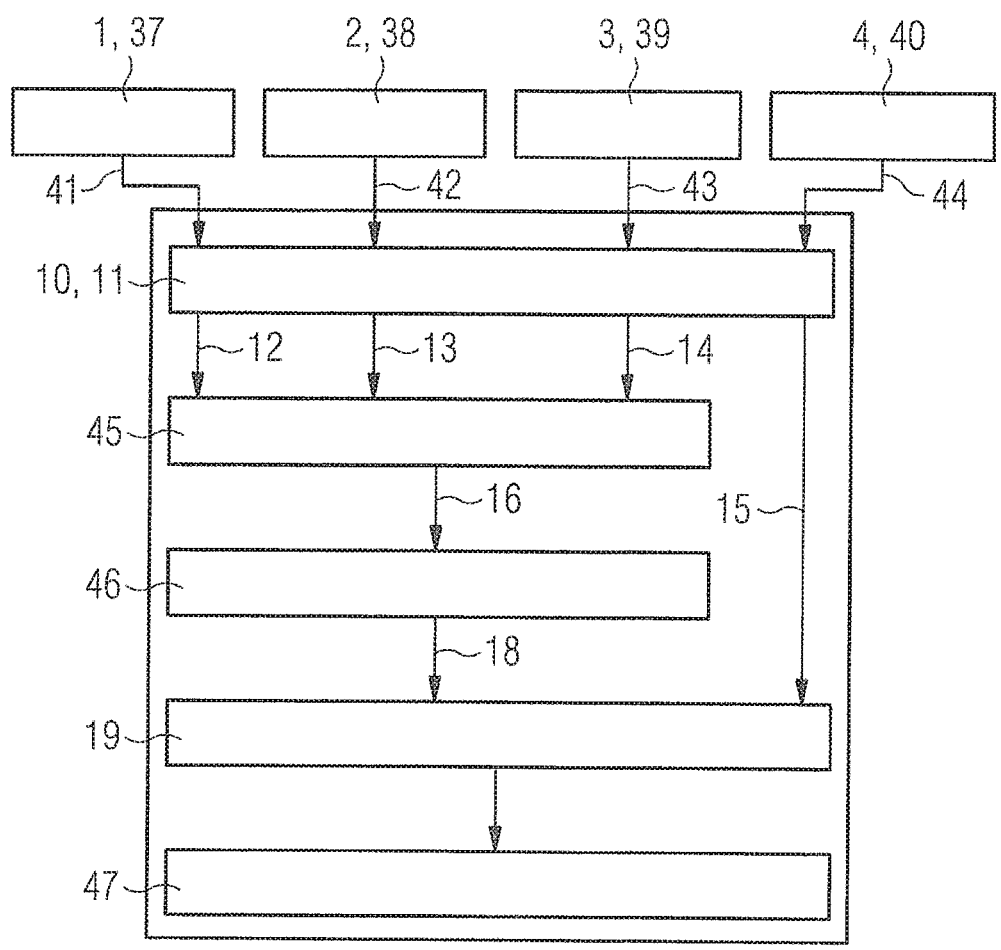
FIG. 3 shows a flowchart relating to an exemplary embodiment of an inventive method for monitoring and diagnosing sensors.

An exemplary embodiment of an inventive, partially computer-implemented method, schematically illustrated in FIG. 3 as a flowchart, is implemented in a vehicle designed as a rail vehicle. A first sensor 1, a second sensor 2, a third sensor 3 and a fourth sensor 4 are, as also shown in FIG. 1, arranged at different locations of a chassis frame 20 likewise illustrated in FIG. 1 and, according to FIG. 1 and FIG. 2, each have different height positions with respect to a vertical axis 27 of the chassis frame 20 shown in FIG. 1.

The first sensor 1, the second sensor 2, the third sensor 3 and the fourth sensor 4 are formed as three-axis acceleration sensors and measure accelerations in directions of a longitudinal axis 35 of the chassis frame 20, a transverse axis 36 of the chassis frame 20, which are illustrated in FIG. 2, and the vertical axis 27 of the chassis frame 20. The first sensor 1 accordingly performs first measurements 37 with respect to a first measuring point 5 shown in FIG. 2, the second sensor 2 performs second measurements 38 with respect to a second measuring point 6 shown in FIG. 2, the third sensor 3 performs third measurements 39 with respect to a third measuring point 7 shown in FIG. 2 and the fourth sensor 4 performs fourth measurements 40 with respect to a fourth measuring point 8 shown in FIG. 2.

Corresponding measuring results are transmitted as measuring signals over a first data line 31 and a second data line 32, which are shown in FIG. 1, and further data lines to an arithmetic unit 9 of the vehicle, which is also shown in FIG. 1, and fed there to signal processing 10 and a signal evaluation 11. First measuring signals 41 are fed from the first sensor 1, second measuring signals 42 are fed from the second sensor 2, third measuring signals 43 are fed from the third sensor 3 and fourth measuring signals 44 are fed from the fourth sensor 4 to signal processing 10 and signal evaluation 11.

During signal processing 10 and signal evaluation 11 acceleration information is extracted from the first measuring signals 41, the second measuring signals 42, the third measuring signals 43 and the fourth measuring signals 44, and corresponding acceleration components are formed in the directions of the longitudinal axis 35, the transverse axis 36 and the vertical axis 27 of the chassis frame 20, i.e., acceleration vectors a (with respect to the first sensor 1 a first acceleration vector $a_1$, with respect to the second sensor 2 a second acceleration vector $a_2$, with respect to the third sensor 3 a third acceleration vector $a_3$ and with respect to the fourth sensor 4 a fourth acceleration vector). Here, first measured value set 12 is generated from the first measuring signal 41, a second measured value set 13 from the second measuring signal 42, a third measured value set 14 from the third measuring signal 43 and a fourth measured value set 15 from the fourth measuring signal 44, i.e., the first measured value set 12, the second measured value set 13, the third measured value set 14 and the fourth measured value set 15 comprise the corresponding acceleration vectors a.

A reference value set formation 45 occurs in the arithmetic unit 9 with the first measured value set 12, the second measured value set 13, the third measured value set 14 and the fourth measured value set 15. For this, a reference value set 16 is formed via first kinematic correlations between the first measured value set 12 and the first measuring point 5, the second measured value set 13 and the second measuring point 6, the third measured value set 14 and the third measuring point 7 as well as the fourth measured value set 15 and the fourth measuring point 8, on the one hand, and a reference point 17 illustrated in FIG. 2, on the other hand. The reference value set 16 comprises reference acceleration components and a reference acceleration vector $a_0$ with respect to the reference point 17.

Furthermore, a test value set formation 46 occurs via a second kinematic correlation between the reference value set 16 and the reference point 17, on the one hand, and the fourth measuring point 8, on the other hand. A correspondingly generated test value set 18 comprises acceleration components or a test acceleration vector $a_p$ calculated from the first measured value set 12, the second measured value set 13, the third measured value set 14 and the reference value set 16 in respect of the fourth measuring point 8.

In principle, the following first kinematic correlation is used to form the reference value set 16 and the test value set 18:

$$a = a_0 + \omega \times (\omega \times r_P) + \dot{\omega} \times r_P \qquad \text{Eq. 1}$$

Here, reference acceleration vector $a_0$ is formed via inversion of the above-mentioned first kinematic correlation for the acceleration vectors a from the acceleration vectors a, an angular velocity vector $\omega$ of the chassis frame 20, an angular acceleration vector $\dot{\omega}$ of the chassis frame 20 and from distance vectors $r_P$ between the first measuring point 5, the second measuring point 6 and the third measuring point 7, on the one hand, and the reference point 17, on the other hand.

The reference acceleration vector $a_0$ has components in three spatial directions, an x-reference acceleration component $a_{0x}$, a y-reference acceleration component $a_{0y}$ and a z-reference acceleration component $a_{0z}$, and is defined as follows:

$$a_0 = \begin{bmatrix} a_{0x} \\ a_{0y} \\ a_{0z} \end{bmatrix} \qquad \text{Eq. 2}$$

The term $\omega \times (\omega \times r_P)$ is converted as follows:

$$\omega \times (\omega \times r_P) = \begin{bmatrix} 0 & -r_x & -r_x & 0 & r_z & r_y \\ -r_y & 0 & -r_y & r_z & 0 & r_x \\ -r_z & -r_z & 0 & r_y & r_x & 0 \end{bmatrix} \cdot \begin{bmatrix} \omega_x^2 \\ \omega_y^2 \\ \omega_z^2 \\ \omega_y \omega_z \\ \omega_x \omega_z \\ \omega_x \omega_y \end{bmatrix} \qquad \text{Eq. 3}$$

where the distance vectors $r_P = [r_x\ r_y\ r_z]^T$ have distance components in the direction of the longitudinal axis 35 of the chassis frame 20 (x-distance components $r_x$), in the direction of the transverse axis 36 of the chassis frame 20 (y-distance components $r_y$) and in the direction of the vertical axis 27 of the chassis frame 20 (z-distance components $r_z$) and the angular velocity vector $\omega = [\omega_x\ \omega_y\ \omega_z]^T$ has angular velocity components with respect to the longitudinal axis 35 of the chassis frame 20 (x-angular velocity component $\omega_x$), with respect to the transverse axis 36 of the chassis frame 20 (y-angular velocity component $\omega_y$) and with respect to the vertical axis 27 of the chassis frame 20 (z-angular velocity component $\omega_z$).

The term $\dot{\omega} \times r_P$ is converted as follows:

$$\dot{\omega} \times r_P = \begin{bmatrix} 0 & -r_z & r_y \\ r_z & 0 & -r_x \\ -r_y & r_x & 0 \end{bmatrix} \cdot \dot{\omega} \qquad \text{Eq. 4}$$

The acceleration vector a means with a 3×3 unit matrix $E_3$ and a rotary matrix R, which takes account of the fact that a first coordinate system 22 of the first measuring point 5, a second coordinate system 23 of the second measuring point 6 and a third coordinate system 24 of the third measuring point 7 are rotated relative to a reference coordinate system 21, i.e., angular position differences occur (see FIG. 2):

$$a = R \cdot \left[ E_3 \cdot \begin{bmatrix} 0 & -r_x & -r_x & 0 & r_z & r_y \\ -r_y & 0 & -r_y & r_z & 0 & r_x \\ -r_z & -r_z & 0 & r_y & r_x & 0 \end{bmatrix} \right. \quad \text{Eq. 5}$$

$$\left. \begin{bmatrix} 0 & -r_z & r_y \\ r_z & 0 & -r_x \\ -r_y & r_x & 0 \end{bmatrix} \right] \cdot \begin{bmatrix} a_{0x} \\ a_{0y} \\ a_{0z} \\ \omega_x^2 \\ \omega_y^2 \\ \omega_z^2 \\ \omega_y \omega_z \\ \omega_x \omega_z \\ \omega_x \omega_y \\ \dot{\omega} \end{bmatrix}$$

The reference acceleration vector $a_0$, or its components in three spatial directions, and the angular velocity vector $\omega$ and the angular acceleration vector $\dot{\omega}$ are determined from a geometric term:

$$D = R \cdot \left[ E_3 \cdot \begin{bmatrix} 0 & -r_x & -r_x & 0 & r_z & r_y \\ -r_y & 0 & -r_y & r_z & 0 & r_x \\ -r_z & -r_z & 0 & r_y & r_x & 0 \end{bmatrix} \cdot \begin{bmatrix} 0 & -r_z & r_y \\ r_z & 0 & -r_x \\ -r_y & r_x & 0 \end{bmatrix} \right] \quad \text{Eq. 6}$$

and the acceleration vectors $$a = \begin{bmatrix} a_1 \\ a_2 \\ a_3 \end{bmatrix}$$

originating from the first measurements 37, the second measurements 38 and the third measurements 39, where $a_1$, $a_2$ and $a_3$ each have acceleration components in the direction of the longitudinal axis 35 of the chassis frame 20, the transverse axis 36 of the chassis frame 20 and the vertical axis 27 of the chassis frame 20, via a formation rule:

$$\begin{bmatrix} a_{0x} \\ a_{0y} \\ a_{0z} \\ \omega_x^2 \\ \omega_y^2 \\ \omega_z^2 \\ \omega_y \omega_z \\ \omega_x \omega_z \\ \omega_x \omega_y \\ \dot{\omega} \end{bmatrix} = D^{-1} \cdot a \quad \text{Eq. 7}$$

the formation rule may be solved via a method of adjustment theory (for example, least squares method) known from the prior art. Inventively, it is also conceivable to ignore small, square angular velocity terms:

$$\begin{bmatrix} \omega_x^2 \\ \omega_y^2 \\ \omega_z^2 \\ \omega_y \omega_z \\ \omega_x \omega_z \\ \omega_x \omega_y \end{bmatrix} \quad \text{Eq. 8}$$

so that a necessary computing power can be reduced.

With the reference acceleration vector $a_0$, the angular velocity vector $\omega$ (if said small terms are not ignored), the angular acceleration vector $\dot{\omega}$ and a test distance vector $r_{P_p}$ between the reference point 17 and the fourth measuring point 8, the test acceleration vector $a_p$ with respect to the fourth measuring point 8 is determined via a second kinematic correlation:

$$a_p = a_0 + \omega \times (\omega \times r_{P_p}) + \dot{\omega} \times r_{P_p} \quad \text{Eq. 9}$$

from which vector the test value set 18 is formed.

A comparison 19 of the test value set 18 with the fourth measured value set 15 is performed, with differences between the acceleration components of the test value set 18 and the acceleration components of the fourth measured value set 15 being formed. If these differences fall short of defined threshold values, then the fourth sensor 4 has a fault or is damaged, and this is detected. A warning event generation 47, i.e., generation of monitoring and/or diagnostic data, occurs in the arithmetic unit 9 based on this type of detection.

The monitoring and/or diagnostic data are evaluated by radio via a vehicle antenna with a transceiver unit, to which the arithmetic unit 9 is connected, transmitted to a maintenance position, which has a corresponding receiver, and evaluated there on a maintenance computer. Furthermore, it is conceivable, to read out the monitoring and/or diagnostic data, for example, via a Universal Serial Bus (USB) (not shown) port of the arithmetic unit 9 and to then evaluate it in a depot or in the maintenance position. Inventively it is also conceivable, however, to transmit the monitoring and/or diagnostic data directly from the arithmetic unit 9 over a data bus to a driver's cab of the vehicle and to show the data there on a driver's cab display.

The inventive method therefore fulfils a monitoring function with respect to a vehicle component (i.e., with respect to the fourth sensor 4). Furthermore, it is conceivable that the inventive method fulfils a diagnostic function with respect to the vehicle component. For this, comparisons 19 are made over a long period (days, weeks, etc.) and using long-term behavior of the fourth sensor 4 a check is performed to determine whether, over this period, the differences between the acceleration components of the test value set 18 and the acceleration components of the fourth measured value set 15 increase. If such an increase is detected, then this points to a developing defect of the fourth sensor 4. By way of a corresponding prognosis or a remaining service life of the fourth sensor 4, replacement thereof is prepared by triggering an acquisition of a replacement part.

In addition to monitoring and/or diagnosis of the fourth sensor 4, the first sensor 1, the second sensor 2 and the third sensor 3 are also monitored and/or diagnosed. For monitoring and/or diagnosis of the first sensor 1, the reference value set 16 and the test value set 18 are formed based on the second measured value set 13, the third measured value set 14 and the fourth measured value set 15. A detection of faults in or damage to the first sensor 1 is achieved by comparing 19 the test value set 18 with the first measured value set 12. Accordingly, a detection of faults in or damage to the second sensor 2 occurs based on the first measured value set 12, the third measured value set 14 and the fourth measured value set 15 and faults in or damage to the third sensor 3 based on the first measured value set 12, the second measured value set 13 and the fourth measured value set 15. The remaining three sensors are therefore respectively used for monitoring and/or diagnosing each of the four sensors. As a result, reciprocal checking or monitoring or diagnosis of the first sensor 1, the second sensor 2, the third sensor 3 and the fourth sensor 4 is achieved. It should be understood, inventively, more than four sensors can be provided, whereby higher quality monitoring and/or diagnosis is effected.

The inventive method, i.e., the first measurement 37, the second measurement 38, the third measurement 39 and the fourth measurement 40 as well as signal processing 10, the signal evaluation 11, formation of the reference value set 45, formation of the test value set 46, the comparison 19 and the warning event generation 47, is performed continuously during use of the vehicle with a frequency of 10 Hz, with higher or lower frequencies of course also being conceivable. Furthermore, it is also conceivable to perform the first measurement 37, the second measurement 38, the third measurement 39 and the fourth measurement 40, on the one hand, and signal processing 10, the signal evaluation 11, formation of the reference value set 45, formation of the test value set 46, the comparison 19 and the warning event generation 47, on the other hand, at different frequencies. Inventively it is also possible that individual method steps are combined, i.e., performed in one step, such as formation of the reference value set 45 and formation of the test value set 46.

Inventively it is also conceivable that the sensors are, for example, provided not on the chassis frame 20 but also on or in other vehicle components, such as on dampers, or in wheelset bearing housings, for example, the first sensor 1 on a first damper, the second sensor 2 on a second damper, the third sensor 3 on a third damper and the fourth sensor 4 on a fourth damper. Measurement and evaluation of damper parameters (for example, speeds, accelerations or pressures) in accordance with the disclosed embodiments of the inventive method therefore enables reciprocal monitoring of the first damper, the second damper, the third damper and the fourth damper, i.e., of vehicle components.

Figure 4:
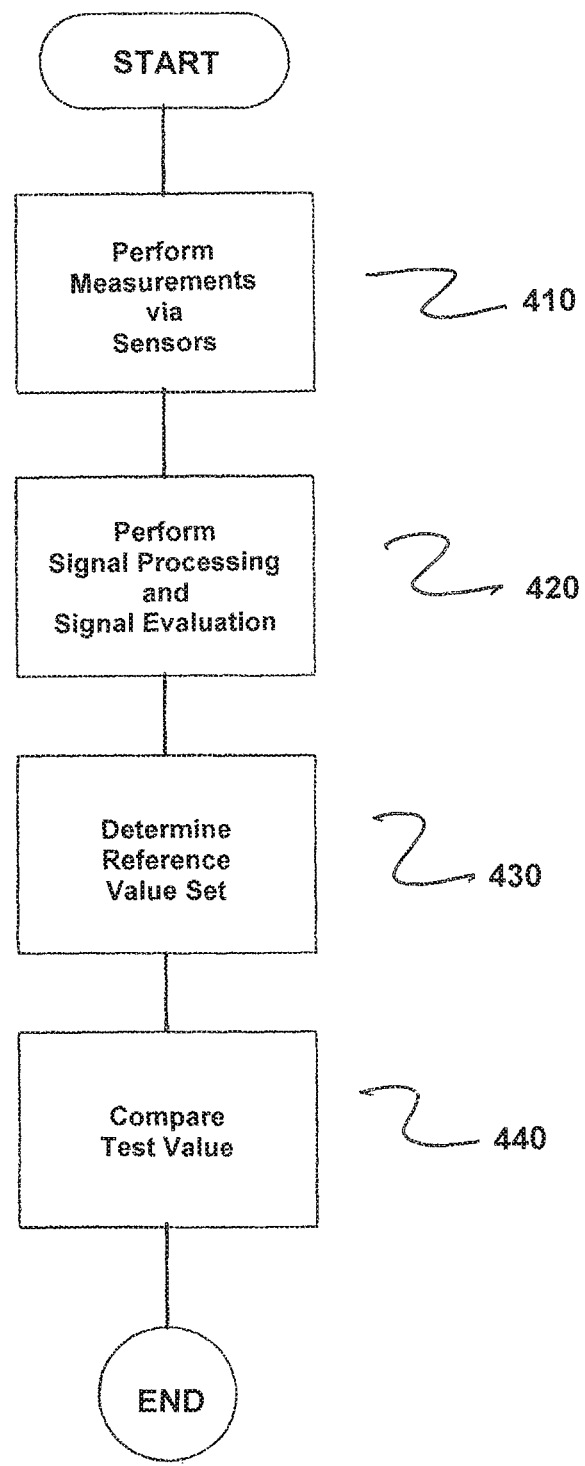
FIG. 4 shows an alternative flowchart of the method in accordance with the invention.

FIG. 4 is a flowchart of the method for the diagnosing and monitoring vehicle components. The method comprise performing measurements with respect to at least one first measuring point, one second measuring point, one third measuring point and one fourth measuring point of a vehicle via at least one first sensor, at least one second sensor, at least one third sensor and one at least fourth sensor, as indicated in step 410.

Next, signal processing and a signal evaluation is performed in at least one arithmetic unit with correspondingly transmitted measuring signals to thereby form at least one first measured value set, one second measured value set, one third measured value set and one fourth measured value set, as indicated in step 420.

Next, a reference value set 16 with respect to a reference point 17 of the vehicle is determined via the at least first measured value set 12, the second measured value set 13 and the third measured value set 14, and a test value set 18 with respect to the fourth measuring point 8 is formed via the reference value set 16, as indicated in step 430. Here, determination of the reference value set 16 and the test value set 18 is achieved via the formation of kinematic relationships between the at least one first measuring point 5, the second measuring point 6, the third measuring point 7 and the fourth measuring point 8, on the one hand, and the reference point 17, on the other hand.

Next, the test value set 18 is then compared 19 with the fourth measured value set 15 to detect a fault in or damage to the fourth sensor 4, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for the diagnosing and monitoring vehicle components, the method comprising:
   performing measurements with respect to at least one first measuring point, one second measuring point, one third measuring point and one fourth measuring point of a vehicle via at least one first sensor, at least one second sensor, at least one third sensor and one at least fourth sensor;
   performing, by at least one arithmetic-processor with correspondingly transmitted measuring signals, signal processing and a signal evaluation to thereby form at least one first measured value set, one second measured value set, one third measured value set and one fourth measured value set;
   determining, via the at least first measured value set, the second measured value set and the third measured value set, a reference value set with respect to a reference point of the vehicle and forming, via the reference value set, a test value set with respect to the fourth measuring point, said determination of the reference value set and the test value set being achieved via a formation of kinematic relationships between the at least one first measuring point, the second measuring point, the third measuring point and the fourth measuring point, and the reference point, utilizing distance vectors; and
   comparing the test value set with the fourth measured value set to detect a fault in or damage to the fourth sensor.

2. The method as claimed in claim 1, wherein acceleration measurements are performed with respect to three spatial directions via the at least one first sensor, the at least one second sensor, the at least one third sensor and the at least one fourth sensor.

3. The method as claimed in claim 2, wherein accelerations of a chassis frame of the vehicle are measured via the at least one the first sensor, the at least one second sensor, the at least one third sensor and the at least one fourth sensor.

4. The method as claimed in claim 2, wherein the reference value set and the test value set are formed from reference acceleration values at the reference point, angular velocity values, angular acceleration values and from distance values between the reference point, and the at least first measuring point, the second measuring point, the third measuring point and the fourth measuring point.

5. The method as claimed in claim 3, wherein the reference value set and the test value set are formed from reference acceleration values at the reference point, angular velocity values, angular acceleration values and from distance values between the reference point, and the at least first measuring point, the second measuring point, the third measuring point and the fourth measuring point.

6. The method as claimed in claim 4, wherein the reference value set and the test value set are formed from angular position difference values between a reference coordinate system in the reference point, and a first coordinate system in the at least first measuring point, a second coordinate system in the second measuring point, a third coordinate system in the third measuring point and a fourth coordinate system in the fourth measuring point.

7. The method as claimed in claim 4, wherein the reference value set is formed by ignoring square angular velocity terms.

8. The method as claimed in claim 6, wherein the reference value set is formed by ignoring square angular velocity terms.

9. The method as claimed in claim 1, wherein the reference value set is formed via an equalization calculation.

10. The method as claimed in claim 1, further comprising:
at least one of monitoring and diagnosing at least one of the at least one first sensor, the at least one second sensor, the at least one third sensor and the at least one fourth sensor;
wherein at least three remaining sensors are respectively utilized to at least one of monitor and diagnose each of at least four sensors.

11. The method as claimed in claim 1, wherein the vehicle comprises a rail vehicle.

12. A device comprising:
at least one first sensor;
at least one second sensor;
at least one third sensor;
at least one fourth sensor; and
at least one arithmetic processor;
wherein the at least one first sensor, the at least one second sensor, the at least one third sensor, the at least one fourth sensor and the at least one arithmetic processor are arranged on the vehicle;
wherein the device is configured to:
perform measurements with respect to at least one first measuring point, one second measuring point, one third measuring point and one fourth measuring point of a vehicle via at the least one first sensor, the at least one second sensor, the at least one third sensor and the at least one fourth sensor;
perform, by the at least one arithmetic processor with correspondingly transmitted measuring signals, signal processing and a signal evaluation to thereby form at least one first measured value set, one second measured value set, one third measured value set and one fourth measured value set;
determine, via the at least first measured value set, the second measured value set and the third measured value set, a reference value set with respect to a reference point of the vehicle and form, via the reference value set, a test value set with respect to the fourth measuring point, said determination of the reference value set and the test value set being achieved via a formation of kinematic relationships between the at least one first measuring point, the second measuring point, the third measuring point and the fourth measuring point, and the reference point, utilizing distance vectors; and
compare the test value set with the fourth measured value set to detect a fault in or damage to the fourth sensor.

13. The device as claimed in claim 12, wherein the at least first sensor, the at least one second sensor, the at least one third sensor, the at least one fourth sensor and the at least one processor are provided on a chassis of the vehicle.

14. The device as claimed in claim 12, wherein the at least first sensor, the at least one second sensor, the at least one third sensor and the at least one fourth sensor are provided on the chassis of the vehicle, and the at least one processor is provided in or on a vehicle body of the vehicle.

15. The device as claimed in claim 12, wherein the at least first sensor, the at least one second sensor, the at least one third sensor and the at least one fourth sensor each have different installation positions with respect to a plane of the vehicle.

* * * * *